Feb. 13, 1968  K. BREUER ETAL  3,368,368
COUPLING
Filed Feb. 11, 1966

Inventors
KARL BREUER
HELMUT GRUNDIG
LUDGER POTTBÄCKER

United States Patent Office 3,368,368
Patented Feb. 13, 1968

3,368,368
COUPLING
Karl Breuer, Mulheim-Speldorf (Ruhr), Helmut Grundig, Duisburg, and Ludger Pottbäcker, Duisburg-Hamborn, Germany, assignors to Demag Aktiengesellschaft, Duisburg, Germany
Filed Feb. 11, 1966, Ser. No. 526,896
Claims priority, application Germany, Mar. 24, 1965, D 46,886/65
5 Claims. (Cl. 64—8)

ABSTRACT OF THE DISCLOSURE

A coupling permitting pivotal as well as axially rolling movement includes a first shaft or first shaft portion, a second shaft or second shaft portion disposed with its end within an open end of the first shaft portion and an intermediate or middle coupling disposed between the two shaft portions. Torque is transmitted through balls disposed between the intermediate coupling and the first shaft portion and through balls disposed between the intermediate coupling and the second shaft portion.

Summary of the invention

Figure 1:
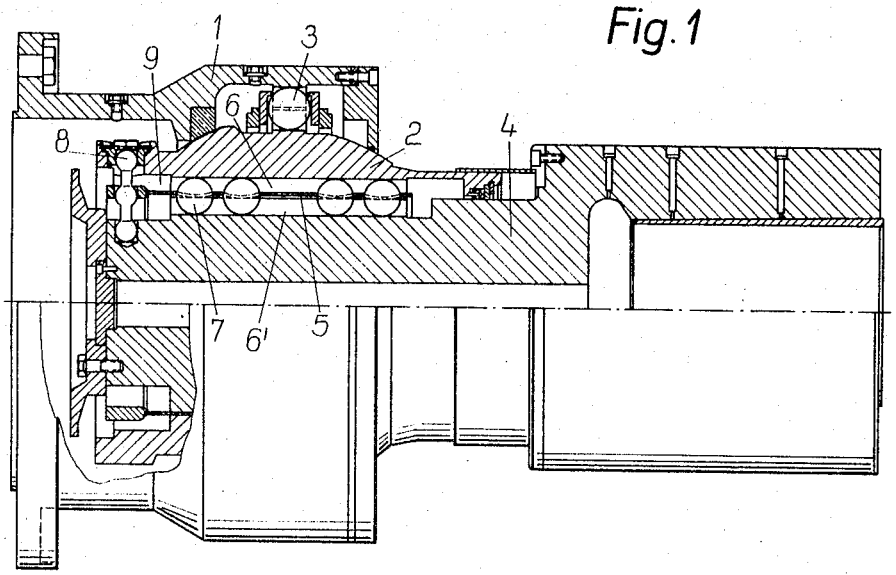

This invention relates in general to coupling constructions and in particular to a new and useful coupling permitting pivotal as well as axially rolling movement.

The present invention relates in general to a coupling of a type for transmitting rotational movements and is thus rigid against torsion but is axially or angularly movable. In a spur gear system which is secured to a driven shaft it is known to arrange a connecting coupling having great axial movability. This is done because the driven pivot moves in the manner of a cone shell when the pivot is subjected to plastic deformation. The end of the pivot of the primary drive shaft moves on a spatially curved elliptical path and requires compensation of length. The connecting coupling between the spatially moving primary drive shaft and the axially fixed engine shaft must therefore be in the form of a double coupling having great axial movability. The known couplings for such drive systems include a knuckle joint shaft and an intermediate shaft between the two knuckle joints heads. The knuckle joint shaft comprises a multi-wedge connection for compensation of length.

Since the displacement angles between the engine shaft and the intermediate shaft and between the engine shaft and the primary drive shaft continuously change and are never equal, torsional vibrations are transmitted through the knuckle joint head into the drive. Attempts to eliminate this disadvantage provide a coupling construction permitting a transmission in a relatively small space of a relatively high torque without vibration. Such couplings permit small axial movements without any additional elements. Frequently, however, an additional greater axial displacement possibility is necessary. In such cases recourse is had to the known muliti-wedge shaft or the known intermediate shaft having short gear teeth which permit some axial movement for the compensation of length during the pivotal movement. While some coupling constructions of this nature permit elimination of the torsional vibrations, the frictional wedge shaft or the short gear teeth connections, respectively, will be subjected to considerable wear since it is very difficult to lubricate these connecting elements. In addition, the axial movement is effected under the influence of the transmission of the torque.

In accordance with the invention there is provided a coupling construction which includes an intermediate coupling element which is mounted between an intermediate shaft and the coupling shaft and which, together with the intermediate shaft, defines an axially extending groove, with the intermediate shaft and the coupling member being separated by an axially extending slot. Balls are arranged in the axially extending groove defined between these parts, and they are advantageously confined in a cage which is controlled by a pivotal member which displaces the ball cage when the intermediate shaft is pivoted in relation to the driving shaft. In a preferred arrangement, the control of the ball cage is effected by means of one or more radially arranged pivotal joint bolts. The bolts are connected so that they are pivotally mounted adjacent an end of the intermediate shaft and pivotally connected to the intermediate coupling element located between the intermediate shaft and the other shaft element.

Accordingly, it is an object of the invention to provide an improved coupling for transmitting torque between two shafts in which the ends of the shafts may be pivoted in relation to each other and including means permitting axial displacement of the shafts relative to each other on rolling balls.

A further object of the invention is to provide a coupling construction which includes a first shaft element, a second shaft element arranged within said first shaft element for pivotal movement in respect thereto, an intermediate between said first and second shaft elements and defining with said second shaft element at least one axially elongated groove adjacent the end of the second shaft element, a plurality of balls confined in the groove for transmitting torque between the intermediate coupling element and said first shaft element to said second shaft element and permitting axial displacement of said second shaft element relative to said first shaft element.

A further object of the invention is to provide a coupling which is simple in design, rugged in construction and economical to manufacture.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there are illustrated and described preferred embodiments of the invention.

In the drawings:
FIG. 1 is a partial elevational and partial longitudinal sectional view of a single joint coupling constructed in accordance with the invention; and
FIG. 2 is a view similar to FIG. 1 of another embodiment of the invention.

Referring to the drawings in particular, the invention embodied therein in FIG. 1 includes a roller joint coupling comprising an outer portion or a first shaft 1, a so-called intermediate shaft or second shaft portion 4, and an interior or middle coupling portion 2 disposed between the first and second shaft portions. Torque is transmitted between the first shaft portion 1 and the middle coupling member 2 by means of balls 3 disposed between the first shaft portion 1 and the middle coupling member 2.

In accordance with the invention, the second shaft portion 4 and the middle coupling member 2 are separated by a slot 5 and they, together form a plurality of semi-cylindrical grooves 6 and 6' which form a passageway for a plurality of balls 7. The balls 7 may roll only in axial directions and permit a compensation of length between the first shaft 1 and the second shaft 4. In a preferred arrangement, the balls 7 are carried in a cage 9 and the cage is connected to a control means 8 which includes a pivotal joint bolt 8 which is pivotal in the second shaft 4 and the middle coupling member 2 and is pivotally secured in a round groove of the cage 9. When the second shaft portion 4 and the middle coupling element 2 are pivoted in respect to the first shaft portion 1, the control 8 will be similarly pivoted to provide for the proper alignment of the cage and the ball 7.

Figure 2:
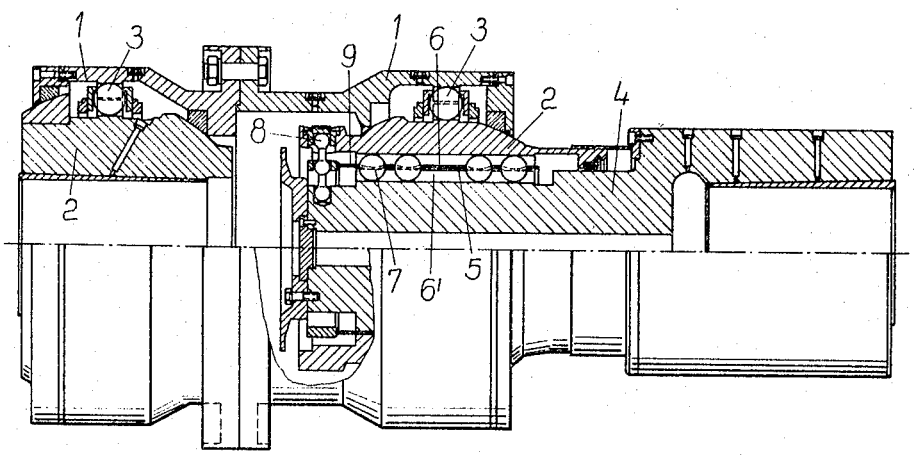

In the embodiment indicated in FIG. 2, the first shaft member 1 is connected to an auxiliary first shaft member 10 which transmits torque through balls 30 to a second intermediate coupling member 20, thus forming a double joint coupling. In this instance, the intermediate shaft 4 is capable of pivotal as well as axially rolling movement as in the other embodiment.

While specific embodiments of the invention have been shown and described in detail to illustrate the application of the inventive principles, it will be understood that the invention may be embodied otherwise without departing from such principles.

What is claimed is:

1. A coupling comprising a first shaft portion having a hollowed end portion, a second shaft portion having an end located within the hollowed end portion of said first shaft portion, a middle coupling element disposed between the end of said second shaft portion and said first shaft hollowed end portion and connected to said first shaft portion for rotation therewith but being pivotal in respect thereto, opposing means in said middle coupling element and said second shaft portion defining a substantially cylindrical axially extending groove, said middle coupling element being separated from said second shaft section by an axially extending slot, and at least one ball rollable in the groove between said second shaft portion and said middle coupling element for permitting relative axial movement of said second shaft portion relative to said first shaft portion.

2. A coupling according to claim 1, including a cage, and a plurality of balls in said cage being located in said groove.

3. A coupling according to claim 2, including control means connected between said middle coupling element and said second shaft portion and to said cage for controlling the position of said cage with said balls in said groove.

4. A coupling according to claim 3, wherein said control means includes a pin which is pivoted in said second shaft portion and pivoted to said middle coupling element, said cage having an opening pivotally engaging around said pin.

5. A coupling according to claim 1, wherein said first shaft portion includes an end opposite to said hollowed end which includes a hollowed portion, a second middle coupling element in the hollowed end portion of the opposite end of said first shaft portion and connected to said first shaft portion for transmitting rotational torque but being pivotally movable in respect thereto.

References Cited
UNITED STATES PATENTS
| | | | |
|---|---|---|---|
| 1,022,909 | 4/1912 | Whitney | 64—7 |
| 2,354,961 | 8/1944 | O'Donnell | 64—8 |
| 2,769,323 | 11/1956 | O'Malley | 64—8 |

FOREIGN PATENTS
1,345,444  10/1963  France.

HALL C. COE, *Primary Examiner.*